(12) United States Patent
Sharma et al.

(10) Patent No.: US 10,830,097 B2
(45) Date of Patent: Nov. 10, 2020

(54) ENGINE CASING WITH INTERNAL COOLANT FLOW PATTERNS

(71) Applicant: GENERAL ELECTRIC COMPANY, Schenectady, NY (US)

(72) Inventors: Ashish Sharma, Garching b. Munich (DE); Guenter Wilfert, Valley (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/016,053

(22) Filed: Feb. 4, 2016

(65) Prior Publication Data

US 2017/0314416 A1 Nov. 2, 2017

(51) Int. Cl.
F01D 25/14 (2006.01)
F01D 11/24 (2006.01)
F01D 21/04 (2006.01)
F01D 25/12 (2006.01)
F02C 3/04 (2006.01)

(52) U.S. Cl.
CPC .............. *F01D 25/14* (2013.01); *F01D 11/24* (2013.01); *F01D 21/045* (2013.01); *F01D 25/12* (2013.01); *F02C 3/04* (2013.01); *F05D 2220/323* (2013.01); *F05D 2240/11* (2013.01); *F05D 2240/14* (2013.01); *F05D 2250/283* (2013.01); *F05D 2260/20* (2013.01); *F05D 2260/204* (2013.01); *Y02T 50/60* (2013.01)

(58) Field of Classification Search
CPC ....................................................... F01D 25/14
See application file for complete search history.

(56) References Cited

U.S. PATENT DOCUMENTS

| 3,824,031 | A | 7/1974 | Gilbert |
| 4,502,276 | A | 3/1985 | Pask |
| 5,351,478 | A | 10/1994 | Walker et al. |
| 5,899,660 | A | 5/1999 | Dodd |
| 6,554,177 | B2 | 4/2003 | Foster et al. |
| 6,619,913 | B2 | 9/2003 | Czachor et al. |
| 8,272,203 | B2 | 9/2012 | Derenes et al. |

(Continued)

FOREIGN PATENT DOCUMENTS

| DE | 102004016462 A1 * | 11/2005 | ............. F01D 25/14 |
| EP | 2 031 191 A2 | 3/2009 | |

(Continued)

OTHER PUBLICATIONS

Extended European Search Report and Opinion issued in connection with corresponding EP Application No. 17154287.1 dated Oct. 13, 2017.

(Continued)

*Primary Examiner* — Igor Kershteyn
*Assistant Examiner* — Juan G Flores
(74) *Attorney, Agent, or Firm* — Dinsmore & Shohl LLP

(57) ABSTRACT

An engine case is provided having a first solid wall region and a second solid wall region with an internal region between the first and second sold wall regions. The internal region defines at least one cavity. One or more lattice structures are provided within the cavity that controls the flow of coolant air through the cavity. The cavity may be divided into two or more distinct cooling regions for allowing particular coolant flow paths to be provided to different parts of the engine case.

14 Claims, 7 Drawing Sheets

(56) References Cited

U.S. PATENT DOCUMENTS

| | | | |
|---|---|---|---|
| 8,434,997 B2* | 5/2013 | Pinero | F01D 11/24 415/115 |
| 2012/0237786 A1 | 9/2012 | Morrison et al. | |
| 2014/0161601 A1 | 6/2014 | Geiger | |
| 2014/0169981 A1 | 6/2014 | Bales et al. | |
| 2014/0321998 A1 | 10/2014 | Maar et al. | |
| 2015/0064016 A1 | 3/2015 | Cortequisse | |
| 2015/0345298 A1* | 12/2015 | Mongillo | F01D 5/187 60/755 |
| 2016/0023272 A1 | 1/2016 | Mongillo, Jr. et al. | |
| 2016/0368050 A1 | 12/2016 | Morris et al. | |
| 2017/0292389 A1* | 10/2017 | Lorstad | F01D 9/023 |

FOREIGN PATENT DOCUMENTS

| | | |
|---|---|---|
| EP | 2 977 679 A1 | 1/2016 |
| JP | 2002-285803 A | 10/2002 |
| JP | 2008-064002 A | 3/2008 |
| JP | 2008-121672 A | 5/2008 |
| JP | 2009-221995 A | 10/2009 |
| JP | 2012-500932 A | 1/2012 |
| JP | 2012-072708 A | 4/2012 |

OTHER PUBLICATIONS

"Autodesk Within," accessed at http://www.withinlab.com/case-studies/new_index10.php, accessed on May 10, 2018, pp. 2.

Machine Translation and Notification of Reasons for Refusal issued in connection with corresponding JP Application No. 2017-017234 dated Feb. 27, 2018.

English Translation of Japanese Office Action for application 2019-081961 dated Mar. 26, 2020 (9 pages).

European Office Action for application 17154287.1 dated Sep. 6, 2018 (3 pages).

European Office Action for application 17154287.1 dated Jul. 24, 2019 (3 pages).

European Office Action for application 17154287.1 dated Feb. 27, 2020 (3 pages).

English Translation of Chinese Office Action for application 201710199418.3 dated Jun. 4, 2018 (7 pages).

English Translation of Chinese Office Action for application 201710199418.3 dated Feb. 26, 2019 (7 pages).

Canadian Office Action for application 2,956,983 dated Apr. 10, 2018 (4 pages).

Canadian Office Action for application 2,956,983 dated Nov. 23, 2018 (3 pages).

Canadian Office Action for application 2,956,983 dated Sep. 6, 2019 (3 pages).

English Translation of Japanese Office Action for application 2017-017234 dated Oct. 29, 2018 (10 pages).

English Translation of Japanese Office Action for application 2017-017234 dated Jun. 27, 2019 (2 pages).

* cited by examiner

ENGINE CASING WITH INTERNAL COOLANT FLOW PATTERNS

INTRODUCTION

This invention relates to improved designs for engine components that include internal cooling passages formed in a sandwich structure within an engine casing. The invention provides structure optimized to provide for one or more of the following characteristics: structural integrity, thermo-mechanical load carrying capability, buckling, containment, cooling flow pressure drop, improved temperature gradient and finally improved life of component.

BACKGROUND

Gas turbine engines include several sections that include rotating blades contained within the engine housing. If a rotating blade breaks it must be contained within the engine housing. To ensure broken blades do not puncture the housing, the walls of the housing have been manufactured to be relatively thick and/or reinforced with fiber fabric. Proposals to reduce weight and strengthen the LPT case have relied on additive manufacturing techniques to prepare a sandwich structure for the case with an intermediate layer that is a porous structure and/or honeycomb structure. See U.S. Pat. Appl'n. Pub. No. 2014/0161601. These designs provide an internal porous or honeycomb structure between the inner and outer walls of an engine casing, which is designed to increase strength while reducing the weight of the engine casing. These designs rely on external piping to cool the composite engine casing.

Gas turbine engines use an active clearance control (ACC) external pipe arrangement to supply cooler air to the surfaces of the engine case. As shown in FIG. 1, external pipes 101 supply cooling air to the outside of the engine case. This type of cooling system is typical in the low pressure turbine (LPT) section of a jet aircraft engine. As shown in FIG. 2, the external cooling pipes 101 direct air from a manifold 202 to help maintain proper temperature of the engine casing and provide proper rotor/case clearance during operation. The complexity of the external piping 101, 102 and ancillary piping tubes, brackets and valve, increases manufacturing costs and increases the engine's weight. A need exists for an engine case having lower weight, increased strength, increased cooling effectiveness, reduced cooling flow, and increased hook sealing efficiency.

BRIEF DESCRIPTION OF THE INVENTION

The present invention relates to improved engine components wherein the component includes an annular section, the annular section including a first solid wall region and a second solid wall region. An internal region is provided between the first and second solid wall regions. The internal region defines at least one cavity, and the cavity includes one or more lattice structures that control the flow of coolant air through the section. In one embodiment, the first and second solid wall regions make up 20%±10% of the thickness of the engine component, and the internal cavity makes up 60%±20% of the thickness of the engine component. The engine component may be the case of a low pressure turbine section of a jet aircraft engine.

In one aspect of the invention, the invention allows providing cooling air from an active clearance control system and/or secondary air system within the internal region of the engine case. The lattice structure provided within the internal cavity can be designed to provide a desired pressure drop in a particular portion of the engine case.

DETAILED DESCRIPTION OF THE INVENTION

The following detailed description sets forth the internal cooling structure for a low pressure turbine (LPT) engine by way of example and not by way of limitation. For example, the present invention may be implemented in other engine parts for case cooling such as high pressure turbine (HPT), the high pressure compressor (HPC), turbine center frame (TCF), and combustor. The description should clearly enable one of ordinary skill in the art to make and use the internal cooling passages, and the description sets forth several embodiment, adaptations, variations, alternatives, and uses of the internal cooling passages, including what is presently believed to be the best mode thereof. The internal cooling passages are described herein as being applied to a few preferred embodiments, namely to different embodiments of the internal cooling passages for an LPT engine case. However, it is contemplated that the internal cooling passages and method of fabricating the internal cooling passages may have general application in a broad range of systems and/or a variety of commercial, industrial, and/or consumer applications other than the internal cooling passages for a LPT case of a turbine engine.

Figure 1:
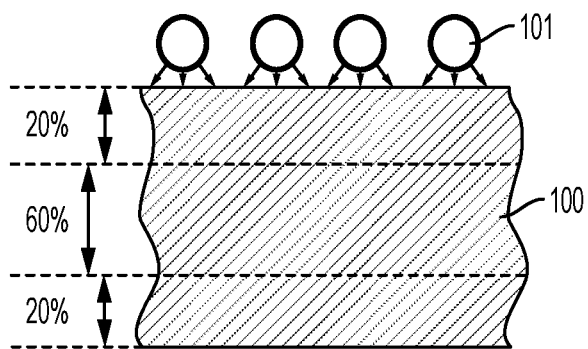
FIG. 1 shows a cross-section of a conventional low pressure turbine engine case.
Figure 2:
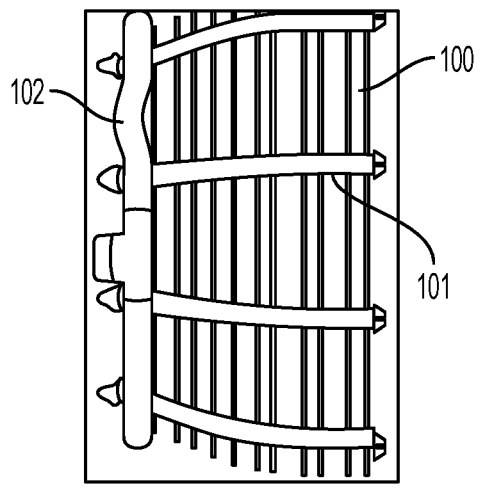
FIG. 2 shows a side-view of a conventional low pressure turbine engine case.
Figure 3:
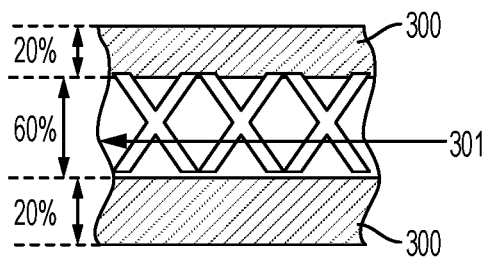
FIG. 3 shows a cross-section of an engine case having an internal cooling passage in accordance with an embodiment of the invention.
Figure 4:
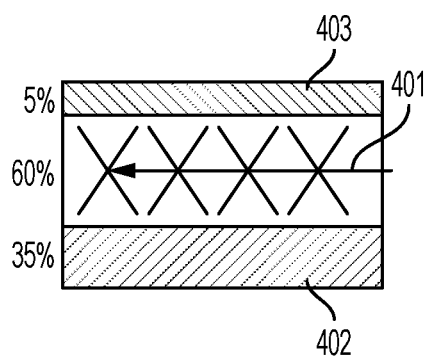
FIG. 4 shows a cross-section of an engine case having an internal cooling passage designed for containment in accordance with an embodiment of the invention.
Figure 5:
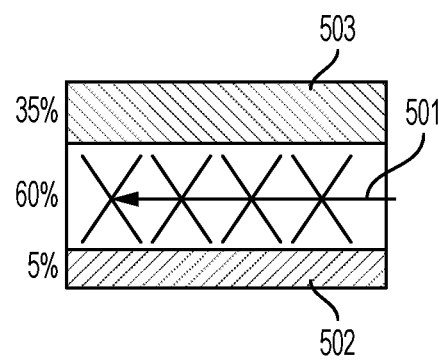
FIG. 5 shows a cross-section of an engine case having an internal cooling passage designed for buckling in accordance with an embodiment of the invention.
Figure 6:
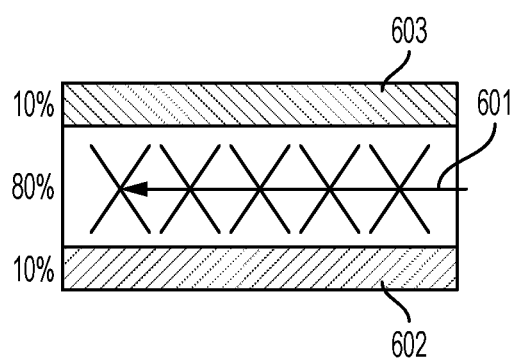
FIG. 6 shows a cross-section of an engine case having an internal cooling passage designed for reduced cooling flow pressure drop in accordance with an embodiment of the invention.

The internal cooling passages are manufactured through additive technology with sandwich structure to reduce weight keeping the same load carrying capabilities as in existing configuration. The thickness of an existing engine case can be divided into two outer sections and an inner section. As shown in FIG. 3, the general design is to place one or more internal cooling flowpaths 301 within the LPT case 300 of an engine. In one embodiment, the internal cooling flowpath 301 occupies approximately 60% of the thickness of the case, where the remaining 40% of thickness is split among the wall of the case 300 on each side of the internal flow path 301. As shown in FIGS. 4-6, however, the relative thickness of the flowpath to the case can be modified to accomplish specific objectives and may also be varied along the length of the engine casing as discussed in connection with FIGS. 10A and 10B. The internal cooling passage is provided with lattice structures that contribute to the engine casing's strength while allowing sufficient air passage (and correspondingly low pressure drop) to enable cooling air to flow through the engine case. The amount of blockage can vary from 20% to 80%, more preferably from 40% to 60%, and most preferably about 50%.

Where containment is a desired objective, such as in the region of a turbine blade, the engine case wall 402 facing inward toward the turbine blade may make up 35% of the thickness of the case, whereas the outer wall 403 may make up 5% of the thickness of the case, leaving 60% of the engine case thickness for the internal coolant flowpath. See FIG. 4. In regions of an engine case designed to prevent buckling of the engine case the inner wall 502 may make up 5% of the case thickness, while the outer wall 503 makes up 35% of the thickness of the case. Again, 60% of the case thickness is reserved for internal cooling passages. See FIG. 5. Where it is desired to increase cooling flow pressure drop, the inner wall 602 and outer wall 602 can each be designed to make up 10% of the thickness of the case leaving 80% of the case thickness for the internal cooling flow path 601. See FIG. 6.

Figure 7:
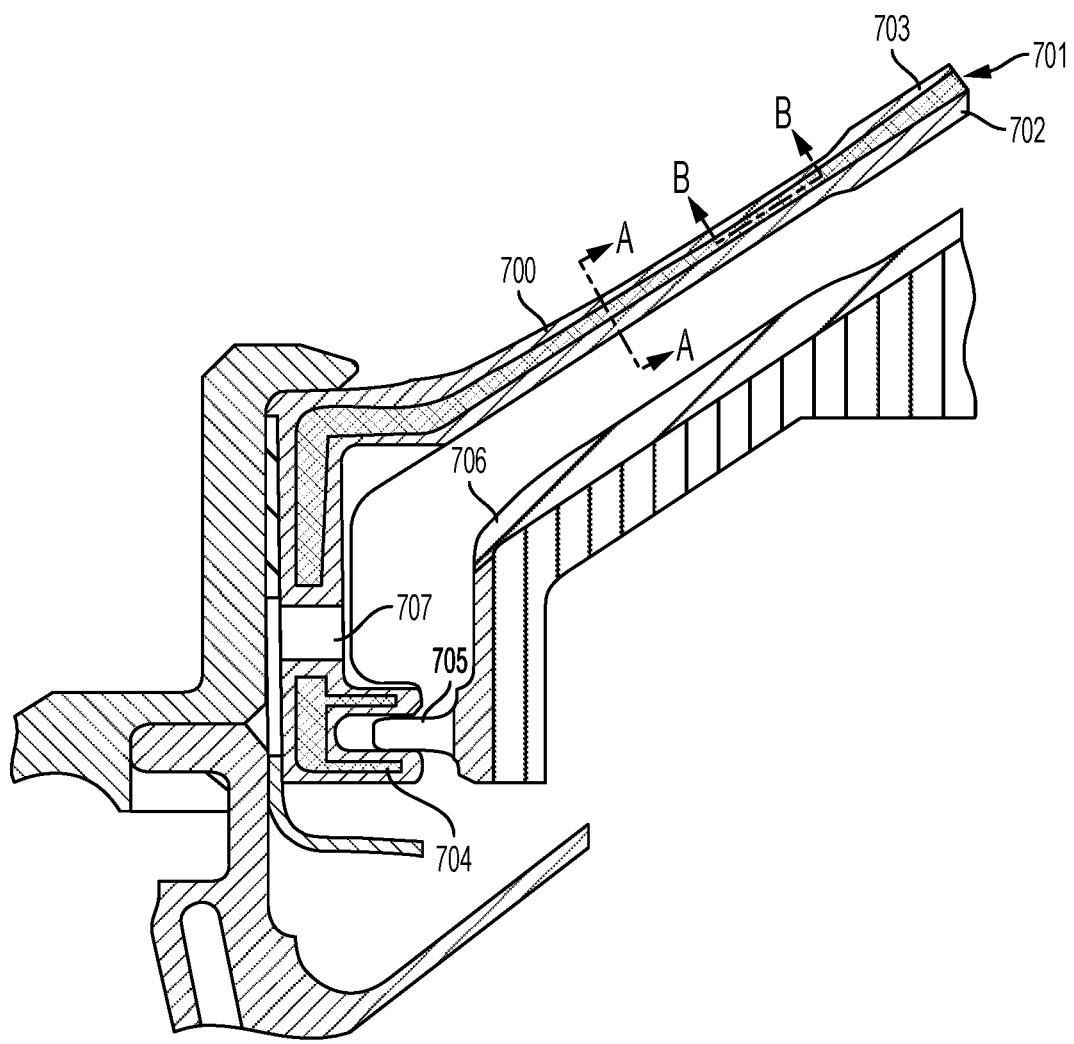
FIG. 7 shows a close-up cross-section of a portion of a low pressure turbine engine case showing the internal cooling passage in accordance with an embodiment of the invention.
Figures 8, 9:
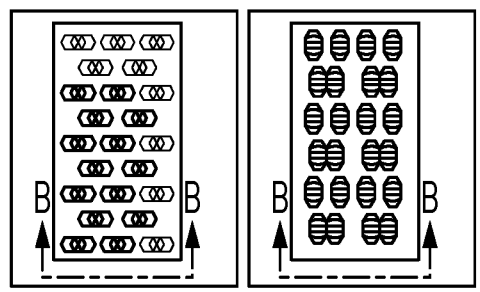
FIG. 8 shows a cross-section the internal cooling passage along axis B-B of the low pressure turbine engine case shown in FIG. 7 with lattice design aligned with the direction of coolant flow.
FIG. 9 shows a cross-section the internal cooling passage along axis B-B of the low pressure turbine engine case shown in FIG. 7 with lattice design aligned against the direction of coolant flow.

FIG. 7 shows a cross section of a portion of the low pressure turbine casing including an annular LPT case 700 having an inner wall 702 and outer wall 703, and an internal cooling passage 701. The inner cooling passage 701 may be extended throughout the case 700, and if desired into the forward hook region 704 that engages with the forward lip 705 of the shroud 706. As shown in FIG. 7, the present invention may be integrated into an engine casing having passages 707 that allow for air flow between the case 700 and the shroud 706. The internal cooling path is provided within the engine case 700 along axis B-B. The flow within the lattice structure may be used to purge/seal the vane-hook region 704 of the flow path. This reduces leakages, improves the thermal gradient, and increases efficiency of the LPT and improves engine housing life. As can be seen in FIGS. 8 and 9, the internal cooling passage 701 includes structures that can have varying orientations relative to the cooling air flow. For example, FIG. 8 shows structures that are aligned with the cooling flow, whereas FIG. 9 shows structures that oppose the cooling flow.

Figure 10A:
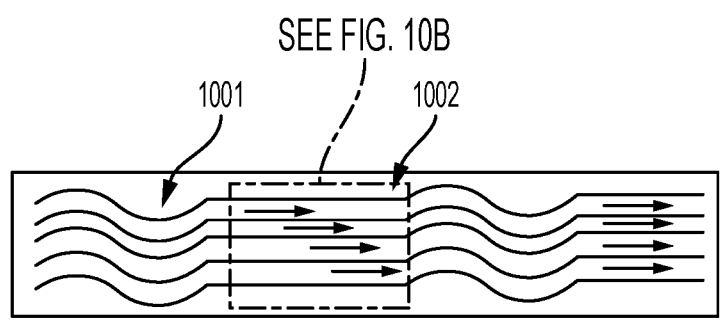
FIG. 10A shows how different internal cooling passage designs affect cooling air flow through the internal passage in accordance with embodiments of the invention.
Figure 10B:
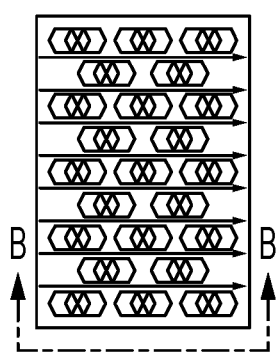
FIG. 10B shows how designs of the internal cooling structure contribute to rigidity and reduced pressure drop for coolant flow in accordance with embodiments of the invention.

As illustrated in FIGS. 10A and 10B which are top view of the cooling flow through different types of lattice structure. In region 1001, the lattice structure is designed to limit flow and provide enhanced structural support to the case, which increases pressure drop through this region. The increased pressure drop may also result from the lattice orientation that restricts flow as shown in FIG. 9. In region 1002, the pressure drop is reduced due to the use of a lattice structure that promotes flow (FIG. 8). An increase in the relative thickness of the internal coolant flow path as described in connection with FIG. 6 may also be used to provide a lower pressure drop.

There are several possible designs for the lattice structure provided within the internal cooling path. The different lattice designs allow for optimizing the porosity and strength of the structural components provided within the internal cooling path. The different lattice types can be any type of desired grid, high-stiffness grid, honeycomb, or sphere-based topology. The grid patterns can be provided using Autodesk® within product described at http://www.within-lab.com/case-studies/new_index10.php. The lattice design can match the external surface of the case while providing hollow interiors for lattices or voids. The internal lattices provide an internal support structure to carry structural and thermal loads. Because the engine case is prepared using additive manufacturing techniques, the specific structure utilized within the internal cooling path can be any desired pattern. By arranging lattice structures within the internal cavity, the need for structural rigidity of the case can be balanced against the desired pressure drop within the coolant cavity.

Figure 11:
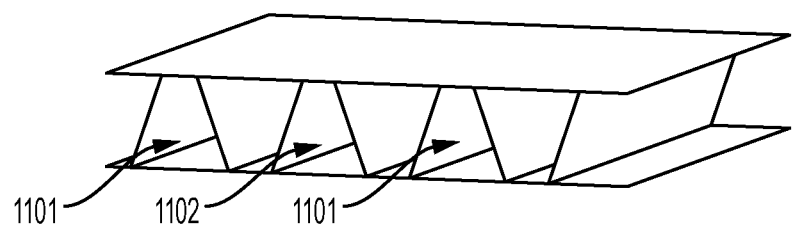
FIG. 11 shows how the internal cooling structure can be designed for multiple flows within an engine case, including a bypass air flow and a high pressure secondary air system (SAS) flow.

In one embodiment, the interior cavity of the engine case is divided into two or more distinct coolant channels as shown in FIG. 11. In an embodiment, bypass air for cooling 1101 can be routed into a first internal cavity, and higher pressure secondary air system (SAS) air 1102 can be routed into the second cavity. In one embodiment, the use of secondary air system (SAS) for cooling is minimized. The lattice structure is optimized to pass cooling flow for the case cooling and maintaining rotor/case clearances.

In one embodiment, the active clearance control (ACC) cooling flow is routed in between two layers along lattice structure to control LPT tip clearance, thus replacing existing solid case with external ACC pipe arrangement. In this embodiment, the external pipes used to cool the solid case in a LPT engine are partially or entirely replaced through the use of internal cooling passages in the case. In this arrangement, the ACC cooling flow may be combined with higher pressure air from the secondary air system (SAS) in order to achieve the cooling and clearance objectives of the system. In this case, the particular coolant path and lattice structure are designed to account for the pressure drop in the system and to optimize the SAS. In one embodiment the ACC cooling flow is routed through plane 1101 and the SAS flow is routed through plane 1102 as shown in FIG. 11. In this case, the ACC flow is used to optimize blade clearance and case temperature, while the SAS flow is used to purge/seal the vane-hook region 704 of the flow path as shown in FIG. 7.

Figure 12:
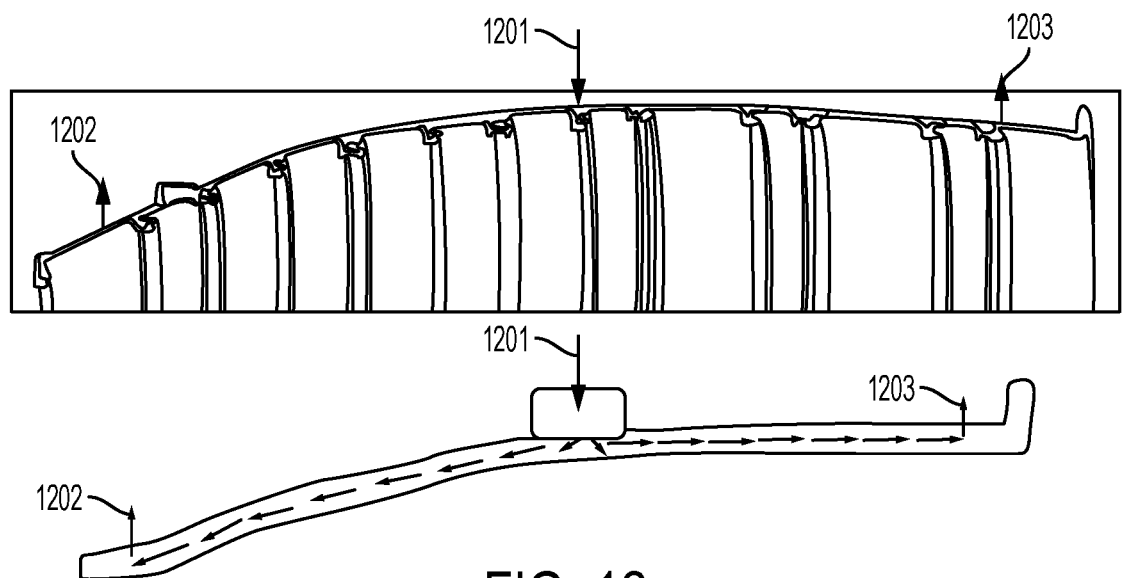
FIG. 12 shows a cross section of an engine case where cooling air is introduced in a central portion of the engine casing and exhausting cooling air near both ends of the casing.
Figure 13:
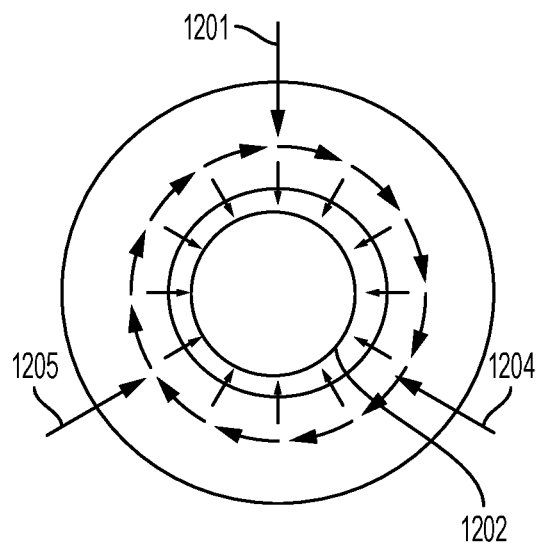
FIG. 13 is an axial view of the LPT engine case of FIG. 12 showing three points of introduction of cooling air and flow path of the air down the length of the engine case.
Figure 14:
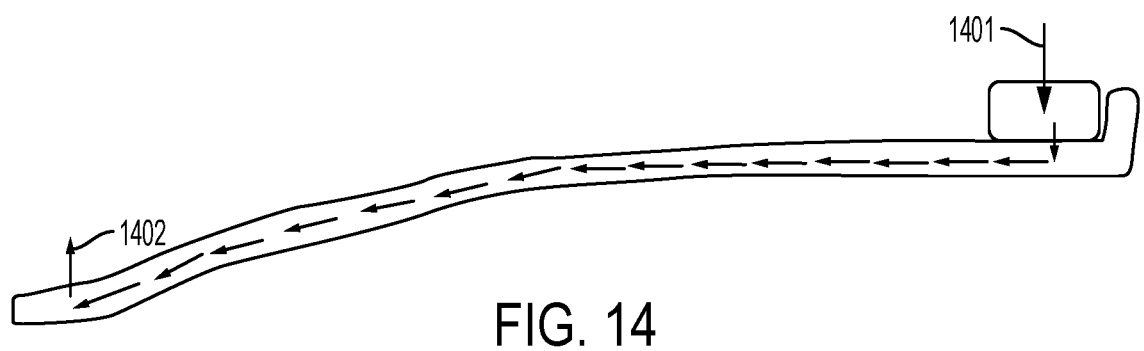
FIG. 14 shows a cross section of an engine case where cooling air is introduced at the rear section of the engine case and expelled from the front of the case.
Figure 15:
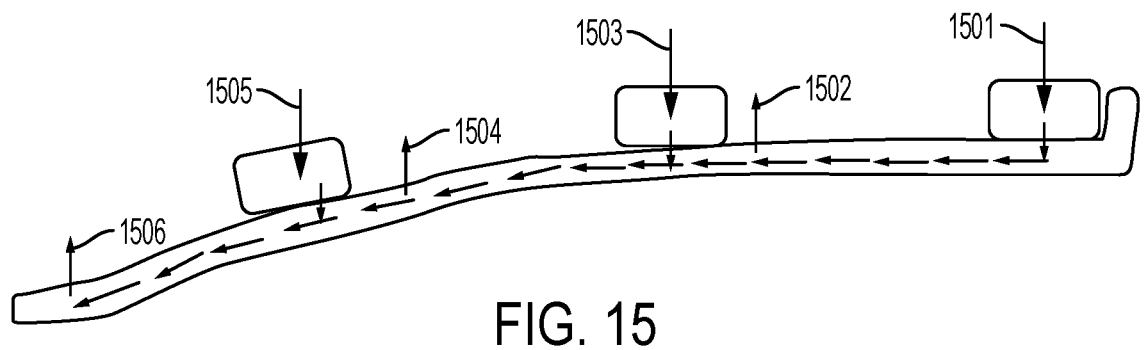
FIG. 15 shows a cross section of an engine case where cooling air is introduced and expelled in three different stages along the length of the engine case.

In one preferred embodiment, the cooling air is introduced to the LPT case near the center of the case at cooling duct 1201 as shown in FIG. 12. The cooling air then travels toward each along the axial direction of the case through the case's internal cooling path and exits at the front 1202 and rear 1203 of the case. As shown in FIG. 13, which is a front view along the axial direction of the case, the cooling air is introduced at three cooling duct locations 1201, 1204 and 1205, and a portion of the cooling air travels toward the front of the case and is exhausted at region 1202. The cooling scheme illustrated in FIGS. 12-13 is advantageous in reducing the pressure drop and minimizing the amount of cooling air supply lines attached to the engine case. Other arrangements are possible. In FIG. 14, the cooling supply duct 1401 is placed at the rear end of the case and cooling air travels the entire length of the case and exhausted at the front of the case 1402. In this case the pressure drop across the case is higher than the embodiment shown in FIGS. 12-13. In FIG. 15, three separate cooling ducts 1501, 1502, and 1503 are used and the cooling air is exhausted at regions 1502, 1504, and 1506. This embodiment provides for lower pressure drop but requires additional ducting around the engine case.

The parts having integrated cooling, e.g., an LPT engine case, may be manufactured according to an additive printing technique, including selective laser sintering (SLS), direct metal laser sintering (DMLS) and three dimensional printing (3DP). The materials can include stainless steel, aluminum, titanium, Inconel 625, Inconel 718, cobalt chrome, among other metal materials. In each of these powder based fabrication methods, powdered material is melted or sintered to form each part layer. The additive manufacture of large parts having integrated cooling can be accomplished using an apparatus and method such as described in U.S. patent application Ser. No. 14/744,982 filed Jun. 19, 2015, entitled "Additive Manufacturing Apparatus and Method for Large Components." Any of the above techniques may be utilized to form the parts having integrated cooling of the present invention.

Exemplary embodiments of a low pressure turbine (LPT) case and method for manufacturing the same are described above in detail. The methods and systems are not limited to the specific embodiments described herein, but rather components of the methods and systems may be utilized independently and separately from other components described herein. For example, the methods and systems described herein may have other industrial and/or consumer application and are not limited to practice with only gas turbine engines as described herein. Rather, the present invention can be implemented and utilized in connection with many other industries. While the invention has been described in terms of various specific embodiments, those skilled in the art will recognize that the invention can be practiced with modification within the spirit and scope of the claims.

What is claimed is:

1. An engine component for an engine comprising:
an annular section comprising a first solid wall region and a second solid wall region;
an internal region between the first and second solid wall regions, wherein the internal region defines at least one cavity, and the at least one cavity comprises a lattice structure that controls a flow of coolant air through the annular section,
wherein the lattice structure includes a first portion defining a first internal cooling flowpath having a first thickness and a second portion defining a second internal cooling flowpath having a second thickness, wherein the second thickness is greater than the first thickness, and wherein the second portion is between two separate first portions in a direction of the flow of coolant air in the internal region.

2. The engine component of claim 1, wherein the first and second solid wall regions make up 20%±10% of the thickness of the engine component, and the at least one cavity makes up 60%±20% of the thickness of the engine component.

3. The engine component of claim 1, wherein the engine is adapted to provide cooling air from an active clearance control system within the internal region.

4. The engine component of claim 1, wherein the engine is adapted to provide cooling air from a secondary air system within the internal region.

5. The engine component of claim 1, wherein the internal region comprises at least a first cooling region and a second cooling region.

6. The engine component of claim 5, wherein the engine is adapted to provide cooling air from an active clearance control system within the first cooling region, and the engine is adapted to provide cooling air from a secondary air system within the second cooling region.

7. The engine component of claim 1, wherein the lattice structure is adapted to structurally support the engine component and provide a desired pressure drop across the at least one cavity.

8. The engine component of claim 1, wherein the engine component is an engine case.

9. The engine component of claim 8, wherein the engine component is the engine case of a low pressure turbine engine.

10. The engine component of claim 5, wherein the pressure drop across the first cooling region is higher than the pressure drop across the second cooling region.

11. The engine component of claim 1, wherein one of the first and second solid wall regions make up 5% of the thickness of the engine component.

12. The engine component of claim 1, wherein the first thickness of the first internal cooling flowpath makes up 60% of the thickness of the engine component and the second thickness of the second internal cooling flowpath makes up 80% of the thickness of the engine component.

13. The engine component of claim 1, wherein the two separate first portions have the same configuration.

14. An engine component for an engine comprising:
an annular section comprising a first solid wall region and a second solid wall region;
an internal region between the first and second solid wall regions, wherein the internal region defines at least one cavity, and the at least one cavity comprises a lattice structure that controls a flow of coolant air through the annular section,
wherein the lattice structure includes a first portion defining a first internal cooling flowpath having a first configuration and a second portion defining a second internal cooling flowpath having a second configuration, wherein the second portion is between two separate first portions in a direction of the flow of coolant air in the internal region, and wherein the two separate first portions have the same first configuration.

* * * * *